United States Patent
Akaguma

(10) Patent No.: US 10,033,919 B2
(45) Date of Patent: Jul. 24, 2018

(54) FOCUS ADJUSTING APPARATUS, FOCUS ADJUSTING METHOD, IMAGE CAPTURING APPARATUS, AND STORAGE MEDIUM

(71) Applicant: CANON KABUSHIKI KAISHA, Tokyo (JP)

(72) Inventor: Takayuki Akaguma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/653,633

(22) Filed: Jul. 19, 2017

(65) Prior Publication Data

US 2018/0027172 A1    Jan. 25, 2018

(30) Foreign Application Priority Data

Jul. 21, 2016 (JP) .................................. 2016-143736
Mar. 30, 2017 (JP) .................................. 2017-068746

(51) Int. Cl.
*H04N 5/232* (2006.01)
*G03B 13/36* (2006.01)
(Continued)

(52) U.S. Cl.
CPC .......... *H04N 5/23212* (2013.01); *G02B 7/28* (2013.01); *G03B 3/10* (2013.01); *G03B 13/36* (2013.01);
(Continued)

(58) Field of Classification Search
CPC .......... H04N 5/23212; H04N 5/23219; H04N 5/2356; G02B 7/28; G02B 7/36;
(Continued)

(56) References Cited

U.S. PATENT DOCUMENTS

| | | | |
|---|---|---|---|
| 9,823,331 B2* | 11/2017 | Yokozeki | G01S 3/7864 |
| 2015/0124157 A1* | 5/2015 | Hongu | G03B 13/36 |
| | | | 348/353 |
| 2016/0205315 A1* | 7/2016 | Irie | G02B 7/28 |
| | | | 348/353 |

FOREIGN PATENT DOCUMENTS

| | | | |
|---|---|---|---|
| JP | 2001-021794 A | | 1/2001 |
| JP | 2002-251380 A | | 9/2002 |

(Continued)

OTHER PUBLICATIONS

The above foreign patent documents were cited in the May 28, 2018 Japanese Office Action, which is enclosed without an English Translation, that issued in Japanese Patent Application No. 2017068746.

*Primary Examiner* — Nelson D. Hernández Hernández

(74) *Attorney, Agent, or Firm* — Cowan, Liebowitz & Latman, P.C.

(57) ABSTRACT

A focus adjusting apparatus detects a first area of a subject and reliability of a tracking position from an image signal output from an image sensor on which a subject image is formed by an optical system, detects focus states of focus detection areas based on the image signal, determines an in-focus area for which focus adjustment of the optical system is to be performed, predicts a focus state in next focus detection based on a history of focus states of the in-focus area, and selects a second area from the focus detection areas. The first area is determined as the in-focus area in a case where a state in which the reliability is higher than a predetermined first threshold continues for a predetermined time period or longer, and the second area is determined as in-focus area otherwise.

14 Claims, 11 Drawing Sheets

(51) Int. Cl.
 *G02B 7/28* (2006.01)
 *G02B 3/10* (2006.01)
 *G03B 3/10* (2006.01)
 *G06K 9/46* (2006.01)

(52) U.S. Cl.
 CPC ....... *H04N 5/23219* (2013.01); *G06K 9/4652* (2013.01); *H04N 5/23293* (2013.01)

(58) Field of Classification Search
 CPC .......... G02B 7/30; G02B 7/305; G02B 7/343; G02B 7/09; G02B 7/04; G02B 7/287; G02B 7/34; G02B 7/285; G02B 7/346; G03B 13/32; G03B 3/00; G03B 3/10; G03B 3/36; G03B 3/02; G03B 3/04; G03B 3/06; G03B 3/12; G03B 3/34
 See application file for complete search history.

(56) References Cited

FOREIGN PATENT DOCUMENTS

| | | |
|---|---|---|
| JP | 2010-008507 A | 1/2010 |
| JP | 2010-113043 A | 5/2010 |
| JP | 2012-208507 A | 10/2012 |
| JP | 2014-235224 A | 12/2014 |

\* cited by examiner

F I G. 7A
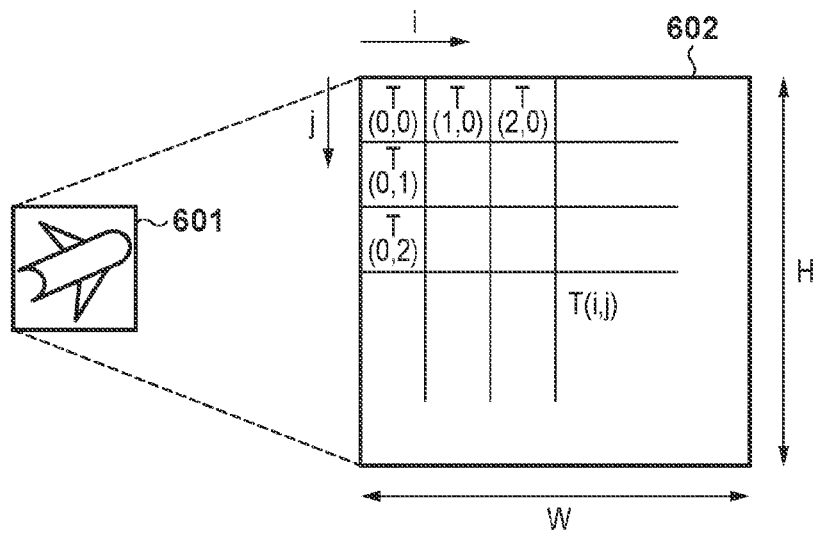
F I G. 7B
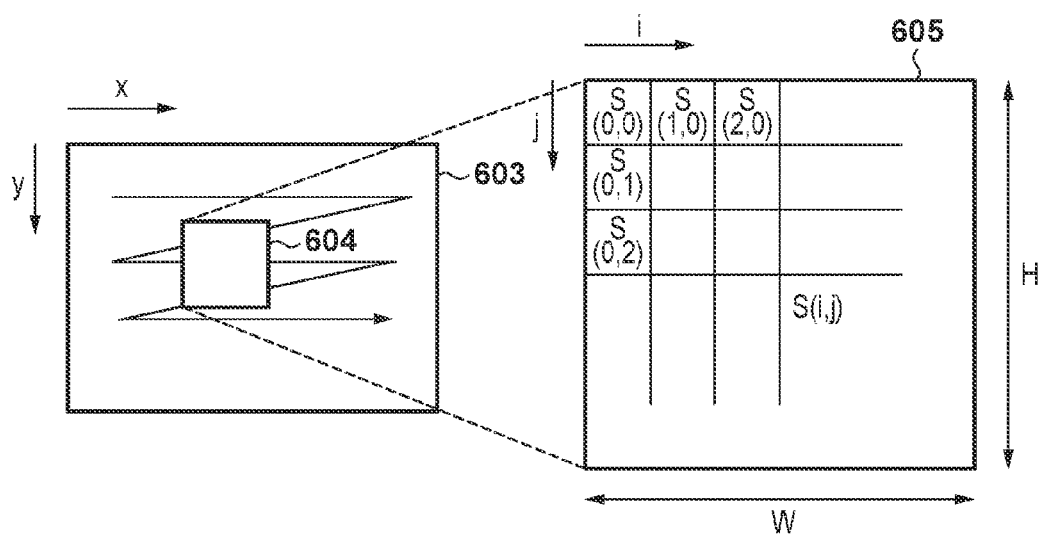

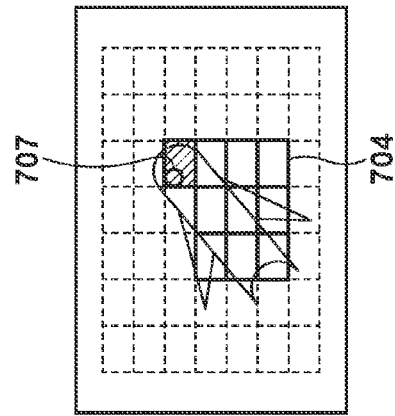
FIG. 10C
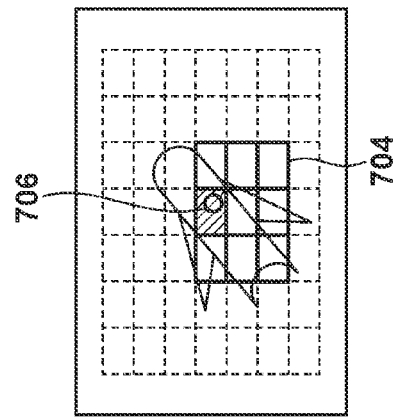
FIG. 10B
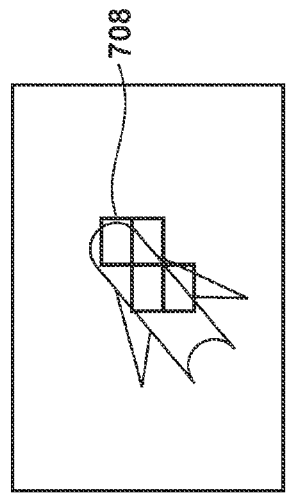
FIG. 10E
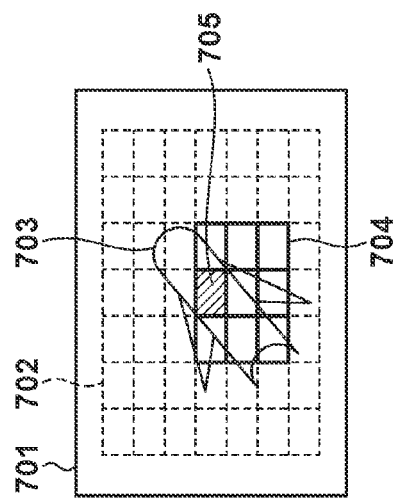
FIG. 10A
FIG. 10D

FOCUS ADJUSTING APPARATUS, FOCUS ADJUSTING METHOD, IMAGE CAPTURING APPARATUS, AND STORAGE MEDIUM

BACKGROUND OF THE INVENTION

Field of the Invention

The present invention relates to a focus adjusting apparatus, a focus adjusting method, an image capturing apparatus including the focus adjusting apparatus, and a storage medium, and especially to a focus adjusting apparatus and a focus adjusting method that perform focus adjustment based on subject tracking, an image capturing apparatus including the focus adjusting apparatus, and a storage medium.

Description of the Related Art

In recent years, focus adjusting apparatuses for tracking a moving subject with high precision have been proposed in large numbers Japanese Patent Laid-Open No. 2001-21794 discloses a method of tracking a movement of a subject in the optical axis direction with high precision, specifically, a focus adjusting apparatus for improving the tracking performance by predicting the position of a future imaging plane of a moving subject. According to Japanese Patent Laid-Open No. 2001-21794, a plurality of past focus detection results are stored, and a function that is most suitable for prediction of a change in the position of the future imaging plane of the subject is selected.

On the other hand, Japanese Patent Laid-Open No. 2012-208507 discloses a method of selecting a tracking position that satisfies predetermined conditions from among a tracking position based on image features of a shot image, a tracking position obtained by prediction based on the past, focus detection results, and a position that has been arbitrarily designated (starting detection point).

Japanese Patent Laid-Open No. 2001-21794 has the risk of tracking failure in the case of movements that cannot be predicted from the past detection results. On the other hand, according to Japanese Patent Laid-Open No. 2012-208507, a position that is designated by a user at the start of shooting is prioritized in the case of unpredictable movements. However, the user needs to keep capturing a subject to be tracked at a predetermined position on a screen; this operation is difficult for a user who is not experienced in operating a camera.

SUMMARY OF THE INVENTION

The present invention has been made in consideration of the above situation, and increases chances to track a subject, that moves irregularly and the movement of which is hard to predict, by using degree of reliability based on image features obtained from shot images. Further, the present invention notifies the user of an area of a tracking subject in an easily recognizable manner.

According to the present invention, provided is a focus adjusting apparatus, comprising: a tracking unit that detects a first area of a subject to be tracked, and reliability of a tracking position from an image signal output from an image sensor that captures a subject image formed on the image sensor by an optical system; a focus detection unit that detects focus states of a plurality of focus detection areas based on the image signal that is output from the image sensor; a determination unit that determines an in-focus area for which focus adjustment of the optical system is to be performed; a prediction unit that predicts a focus state in next focus detection based on a history of focus states of the in-focus area detected by the focus detection unit; and a selection unit that selects a second area from the plurality of focus detection areas, wherein the determination unit determines the first area as the in-focus area in a case where a state in which the reliability is higher than a predetermined first threshold continues for a predetermined time period or longer, and determines the second area as the in-focus area in a case where the state does not continue for the predetermined time period.

Further, according to the present invention, provided is an image capturing apparatus, comprising: an image sensor that outputs an image signal by capturing a subject image formed by an optical system; and a focus adjusting apparatus that comprises: a tracking unit that detects a first area of a subject to be tracked, and reliability of a tracking position from an image signal output from an image sensor that captures a subject image formed on the image sensor by an optical system; a focus detection unit that detects focus states of a plurality of focus detection areas based on the image signal that is output from the image sensor; a determination unit that determines an in-focus area for which focus adjustment of the optical system is to be performed; a prediction unit that predicts a focus state in next focus detection based on a history of focus states of the in-focus area detected by the focus detection unit; and a selection unit that selects a second area from the plurality of focus detection areas, wherein the determination unit determines the first area as the in-focus area in a case where a state in which the reliability is higher than a predetermined first threshold continues for a predetermined time period or longer, and determines the second area as the in-focus area in a case where the state does not continue for the predetermined tame period.

Furthermore, according to the present invention, provided is a focus adjusting method, comprising: detecting a first area of a subject to be tracked, and reliability of a tracking position from an image signal output from an image sensor that captures a subject image formed on the image sensor by an optical system; detecting focus states of a plurality of focus detection areas based on the image signal that is output from the image sensor; determining an in-focus area for which focus adjustment of the optical system is to be performed; predicting a focus state in next focus detection based on a history of focus states of the detected in-focus area; and selecting a second area from the plurality of focus detection areas, determining the first area as the in-focus area in a case where a state in which the reliability is higher than a predetermined first threshold continues for a predetermined time period or longer, and determining the second area as the in-focus area in a case where the state does not continue for the predetermined time period.

Further, according to the present invention, provided is a computer-readable storage medium having stored therein a program which is executable by a computer, the program having program codes for realizing the focus adjusting method that comprises: detecting a first area of a subject to be tracked, and reliability of a tracking position from an image signal output from an image sensor that captures a subject image formed on the image sensor by an optical system; detecting focus states of a plurality of focus detection areas based on the image signal that is output from the image sensor; determining an in-focus area for which focus adjustment of the optical system is to be performed; predicting a focus state in next focus detection based on a history of focus states of the detected in-focus area; and selecting a second area from the plurality of focus detection areas, determining the first area as the in-focus area in a case where a state in which the reliability is higher than a predetermined first threshold continues for a predetermined time period or longer, and determining the second area as the in-focus area in a case where the state does not continue for the predetermined time period.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 7A and 7B show an example of template matching according to the embodiment;

FIGS. 10A to 10E show display examples of display frames according to the embodiment;

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

[Overall Configuration]

Figure 1A:
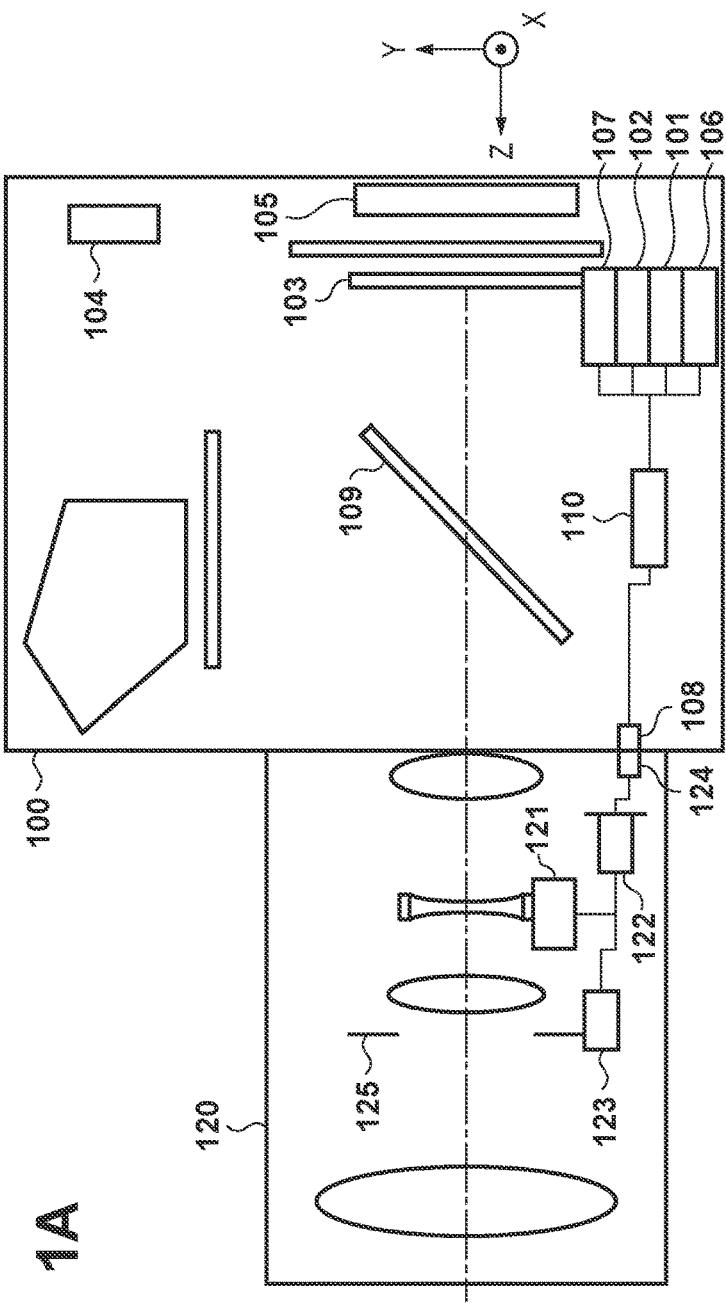
FIG. 1A is a cross-sectional view of an image capturing apparatus according to an embodiment of the present invention.
Figure 1B:
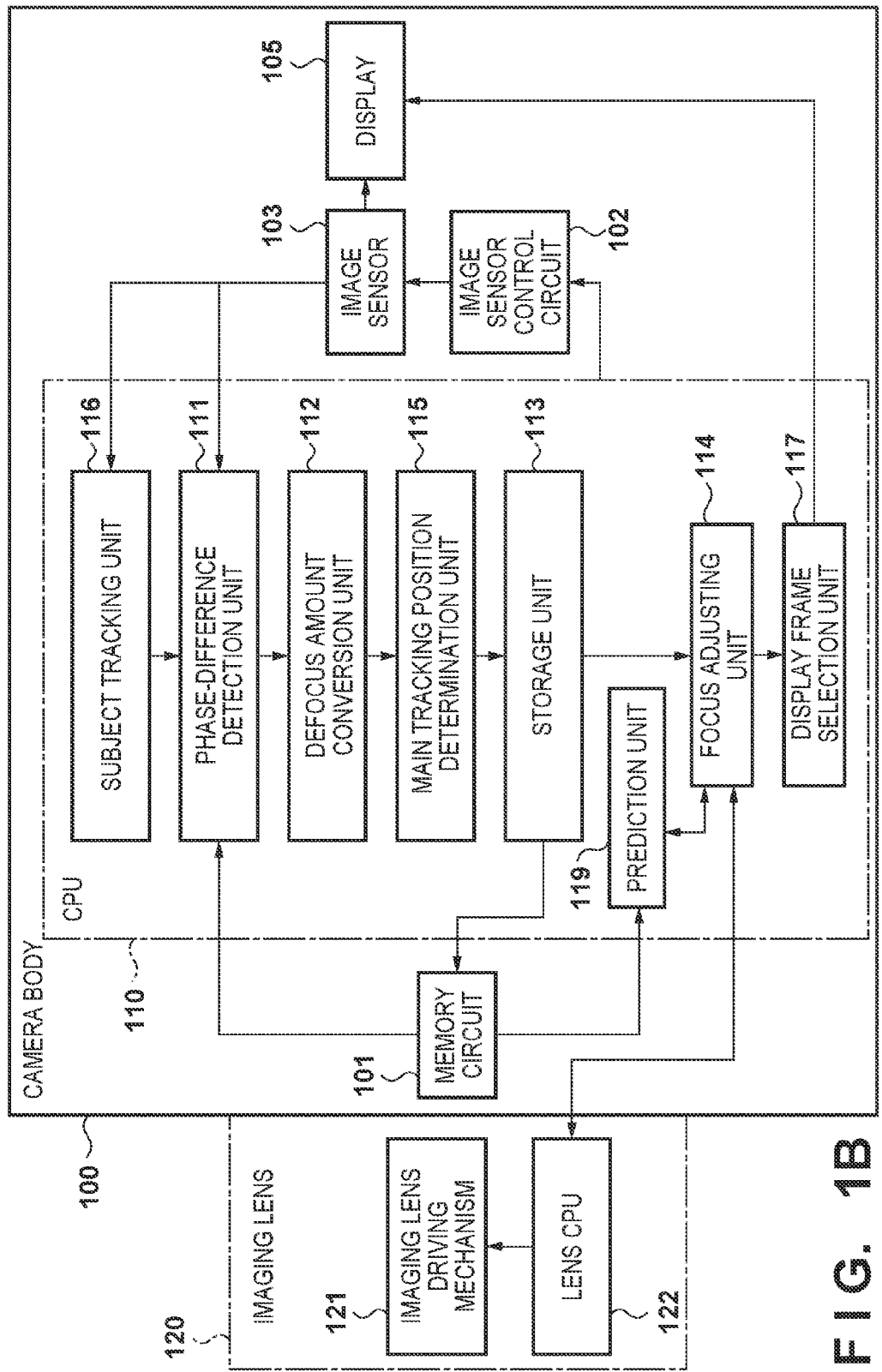
FIG. 1B is a block diagram showing a functional configuration of the image capturing apparatus.

FIGS. 1A and 1B show an overall configuration of an image capturing apparatus according to an embodiment of the present invention; specifically, FIG. 1A is a cross-sectional view of the image capturing apparatus, and FIG. 1B is a block diagram showing a functional configuration of the image capturing apparatus. In general, a camera has two types of modes: a mode for driving a lens relative to an imaging plane of a subject at certain time (one-shot shooting mode), and a mode for driving the lens while predicting a future imaging plane of the subject (servo shooting mode). In the present embodiment, the operations performed when the image capturing apparatus is set to the servo shooting mode will be described.

In the present embodiment, an interchangeable-lens digital still camera, which uses a camera body 100 provided with a viewfinder 104 and an image sensor 103 in combination with an imaging lens 120 provided with an imaging optical system, will be described as the image capturing apparatus. Note that the present invention is not limited to being applied to the interchangeable-lens digital still camera, and can be applied to a variety of optical devices that can perform focus adjustment based on image signals.

The camera body 100 includes the image sensor 103, the viewfinder 104, a display 105, a CPU 110, an image sensor control circuit 102, a memory circuit 101, an interface circuit 106, an image processing circuit 107, an electric contact 108, and a quick return mirror 109.

The image sensor 103 is constituted by, for example, a complementary metal-oxide-semiconductor (CMOS) image sensor or a charge-coupled device (CCD) image sensor, and is placed in the camera body 100 on a planned image forming plane of the imaging lens 120. In the present embodiment, the image sensor 103 will be described as the CMOS image sensor.

Figure 2A:
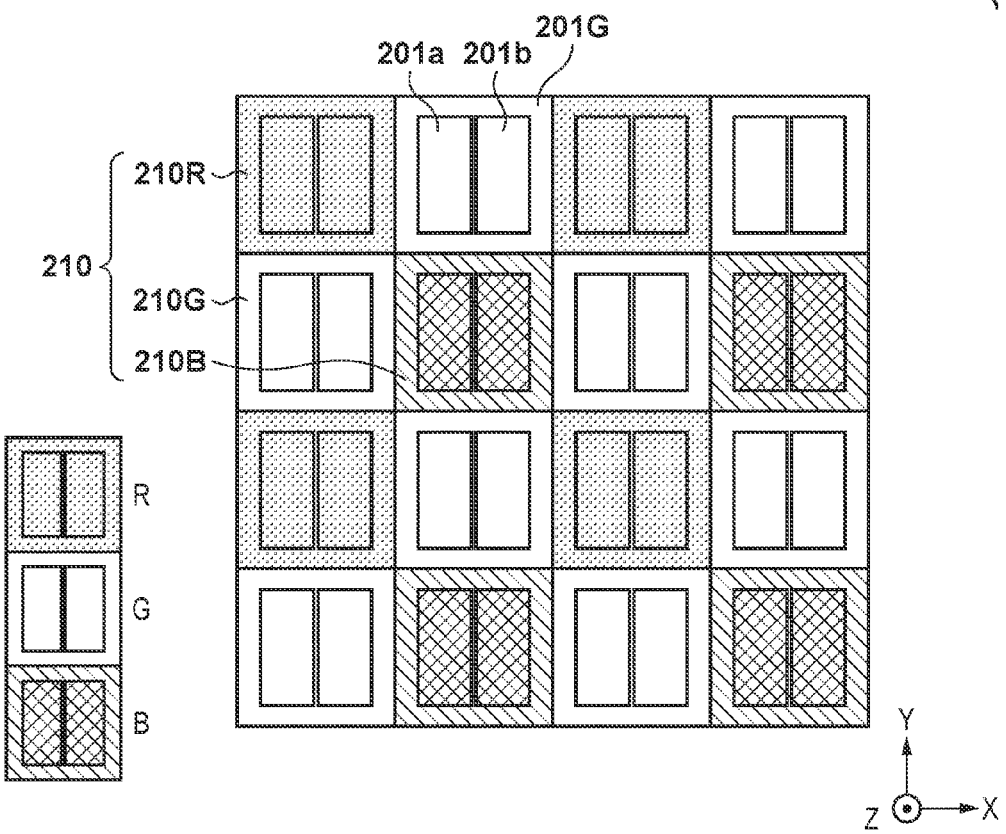
FIGS. 2A and 2B show a structure of an image sensor according to the embodiment.
Figure 2B:
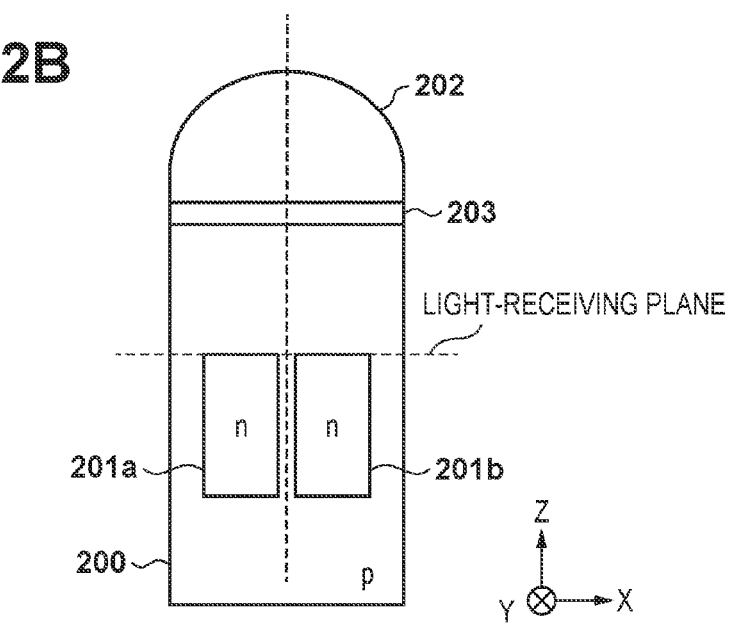

A pixel structure of the image sensor 103 according to the present embodiment will now be described with reference to FIGS. 2A and 2B. FIGS. 2A and 2B show the pixel structure of the image sensor 103; specifically, FIG. 2A is a plan view of a pixel array in the image sensor 103, and FIG. 2B is a cross-sectional view of a pixel 210G.

FIG. 2A shows part of the pixel array in the image sensor 103 in a range of four rows and four columns. A pixel group 210 includes pixels that are arranged in two rows and two columns in accordance with the Bayer array, that is, an upper-left pixel 210R with spectral sensitivity for red (R), upper-right and lower-left pixels 210G with spectral sensitivity for green (G), and a lower-right pixel 210B with spectral sensitivity for blue (B). Each of the pixels 210R, 210G, and 210B includes two photoelectric conversion portions 201a and 201b for pupil division. Each photoelectric conversion portion 201a receives a light beam that has passed through a first pupil area of an exit pupil of the imaging lens 120, and performs photoelectric conversion. Each photoelectric conversion portion 201b receives a light beam that has passed through a second pupil area different from the first pupil area, and performs photoelectric conversion. The pixels structured in the foregoing manner function as imaging pixels and focus detection pixels.

As shown in FIG. 2B, the photoelectric conversion portions 201a and 201b are constituted by photodiodes each of which is composed of a p-type layer 200 and an n-type layer. On a color filter 203, a microlens 202 is placed at a position that is away from a light-receiving plane in the Z direction by a predetermined distance.

In the present embodiment, every one of the pixels 210R, 210G, and 210B of the image sensor 103 includes the photoelectric conversion portions 201a and 201b for pupil division. The two photoelectric conversion portions 201a and 201b enable pupil division using one microlens 202 as they are decentered respectively in the +X direction and the −X direction with respect to an optical axis of the microlens 202. Therefore, pixels including the photoelectric conversion portions 201a and 201b are used as focus detection pixels. Although it will be assumed herein that all pixels are structured as focus detection pixels, the present invention is not limited in this way, and only a part of the entirety of the pixels may be structured as focus detection pixels. Furthermore, although FIG. 2A shows an exemplary arrangement in which the photoelectric conversion portions 201a and 201b are decentered in the X direction with respect to the optical axis of the microlens 202, other arrangements are possible; for example, the photoelectric conversion portions may be decentered in the Y direction, or alternatively, some photo-electric conversion portions may be decentered in the X direction while others are decentered in the Y direction. These arrangements support not only subjects having a luminance distribution in the X direction, but also subjects having a luminance distribution in the Y direction.

Figure 3:
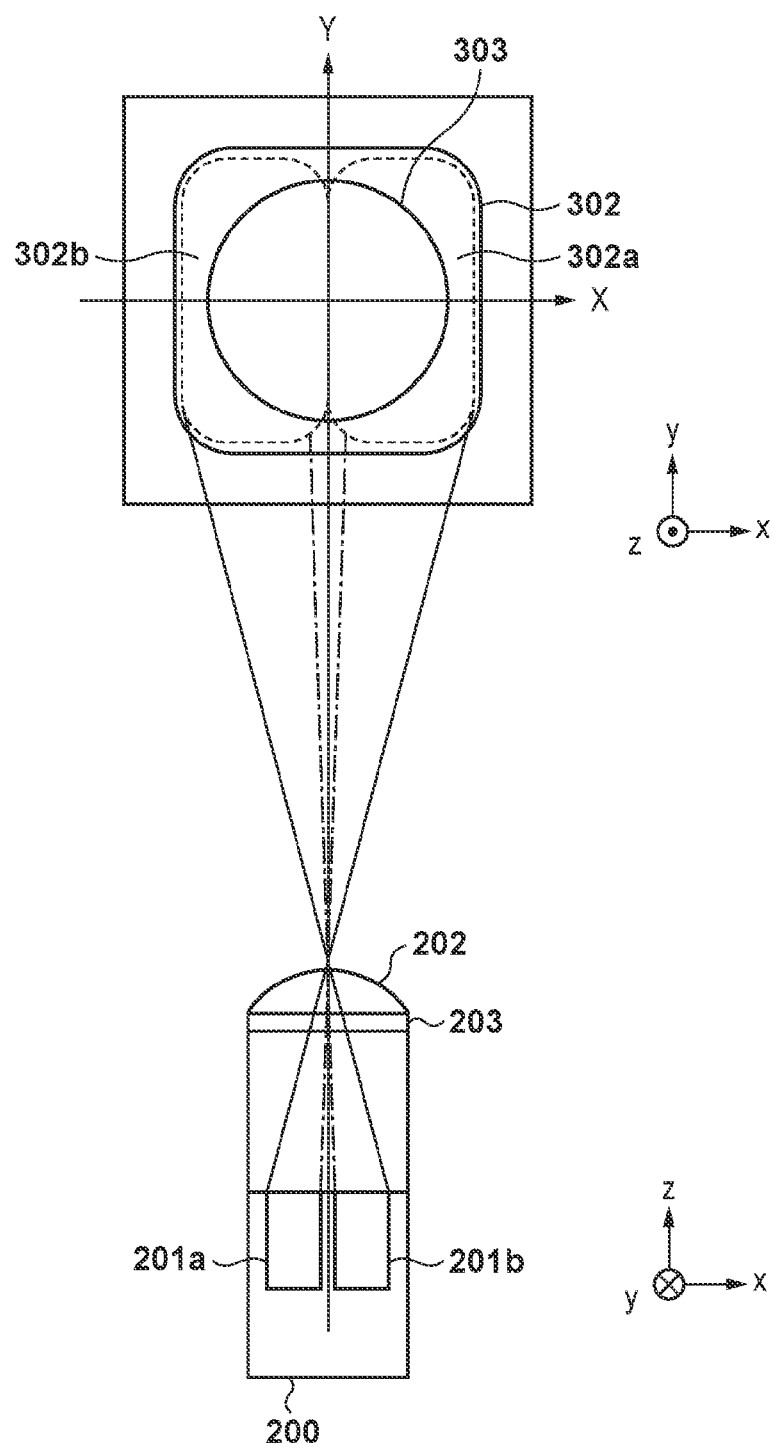
FIG. 3 is a schematic view illustrating a pixel structure and pupil division according to the embodiment.

A pupil division function of the image sensor 103 will now be described with reference to FIG. 3. FIG. 3 illustrates the pupil division function of the image sensor 103, and shows how pupil division is performed on a single pixel. Note that in FIG. 3, the constituent parts that are the same as the constituent parts shown in FIG. 2B are given the same reference numerals thereas.

An upper part of FIG. 3 shows an exit pupil 302 and an aperture frame 303 (e.g., a diaphragm frame or a lens frame). The exit pupil 302 includes pupil areas 302a and 302b that correspond to the photoelectric conversion portions 201a and 201b, respectively. An image signal A is obtained by the photoelectric conversion portion 201a, which is equivalent to the n-type layer decentered in the −X direction. An image signal B is obtained by the photoelectric conversion portion 201b, which is equivalent to the n--type layer decentered in the +X direction.

In the present embodiment, an image signal A is obtained from the plurality of photoelectric conversion portions 201a that are arrayed regularly in the X direction as shown in FIG. 2A. That is, an image signal A is obtained from one of a pair of light beams that has passed through a part of an exit pupil area of the imaging optical system and that has different base-line lengths depending on the f-number. On the other hand, an image signal B is obtained from the plurality of photoelectric conversion portions 201b that are arrayed regularly in the X direction as shown in FIG. 2A. That is, an image signal B is obtained from the other of the pair of light beams that has passed through a different part of the exit pupil area of the imaging optical system and that has different base-line lengths depending on the f-number.

Referring back to FIGS. 1A and 1B, when the quick return mirror 109 is on an optical path to the image sensor 103, it reflects an imaging light beam from the imaging lens 120 toward the viewfinder 104. The viewfinder 104 enables an operator to observe a subject image reflected by the quick return mirror 109. During shooting and a live-view mode, the quick return mirror 109 withdraws from the optical path, thereby enabling a light beam incident via the imaging lens 120 to arrive at the image sensor 103. Although not illustrated, a shutter provided between the quick return mirror 109 and the image sensor 103 is opened during shooting and the live-view mode.

The image sensor control circuit 102 drives and controls the image sensor 103 in accordance with an instruction from the CPU 110. The memory circuit 101 stores images captured by the image sensor 103, as well as a distribution of light received by the image sensor 103. The image processing circuit 107 applies image processing to image signals obtained through shooting performed by the image sensor 103. The interface circuit 106 is used to output, to the outside of the camera, images to which the image processing circuit 107 has applied the image processing. The electric contact 108 comes into contact with an electric contact 124 in the imaging lens 120, and is used in communication of electric power and various types of signals.

The display 105 is composed of, for example, a liquid crystal display (LCD) panel, and displays shot images, shooting information, and so forth. During the live-view mode, the display 105 displays moving images of a planned shooting area in real time. Herein, the live-view mode denotes a mode for reading out subject images that were incident via the imaging lens 120 and formed on the image sensor 103 as low-resolution preview moving images, and displaying the subject images on the display 105 in real time. During this live-view mode, phase-difference AF on an image capturing plane can be performed as will be described later. Furthermore, during continuous shooting, the display 105 displays low-resolution still images obtained through the continuous shooting.

The CPU 110 is a control unit that controls the entire camera integrally. The CPU 110 includes a phase-difference detection unit 111, a subject tracking unit 116, a defocus amount conversion unit 112, a main tracking position determination unit 115, a storage unit 113, a focus adjusting unit 114, a prediction unit 119, and a display frame selection unit 117, calculates a focusing state of the imaging lens 120, and issues a driving instruction.

The phase-difference detection unit 111 detects a relative phase difference between a pair of an image signal A and an image signal B obtained from the image sensor 103, and the defocus amount conversion unit 112 converts the phase difference detected by the phase-difference detection unit 111 into a defocus amount using a conversion coefficient. Based on the features of image signals obtained from the image sensor 103, the subject tracking unit 116 calculates an area of a subject to be tracked (hereinafter, "tracking area"), a position of the subject to be tracked (hereinafter, "tracking position"), and the reliability of tracking (tracking likelihood). The main tracking position determination unit 115 determines a main tracking position (focusing area) to be focused by the focus adjusting unit 114 from among a plurality of tracking positions. The storage unit 113 stores, to the memory circuit 101, the shooting time (a time point of shooting) and a position of an imaging plane of the subject calculated from the converted defocus amount.

The focus adjusting unit 114 instructs a lens CPU 122 to move a focus position based on the converted defocus amount. Furthermore, the focus adjusting unit 114 predicts a position of a future imaging plane using a prediction unit 119, calculates a lens driving amount that is necessary for moving a focus position of the imaging lens 120 to the predicted position of the future imaging plane, and issues an instruction to the lens CPU 122 accordingly.

The display frame selection unit 117 selects a frame that shows a subject area being tracked and is to be superimposed on a shot low-resolution still image when it is displayed on the display 105.

The imaging lens 120 is an interchangeable lens that is attachable to and detachable from the camera body 100. The imaging lens 120 includes the lens CPU 122, an imaging lens driving mechanism 121, a diaphragm driving mechanism 123, a diaphragm 125, the electric contact 124, and the imaging optical system that is composed of, for example, a lens assembly including a focusing lens.

The imaging lens driving mechanism 121 forms an optical image of a subject to be shot on the image sensor 103 by driving the lens assembly including a plurality of lenses so as to move the focus position, which is in the vicinity of an image capturing plane of the image sensor 103, in the optical axis direction. The lens CPU 122 receives focus adjustment information transmitted from the CPU 110 of the camera body 100 via the electric contact 124, and drives the imaging lens driving mechanism 121 based on the focus adjustment information.

The diaphragm driving mechanism 123 has a mechanism for driving the diaphragm 125 and an actuator therefor, and drives the diaphragm 125 in accordance with an instruction from the camera CPU 110.

[Image Capture Processing]

Figure 4:
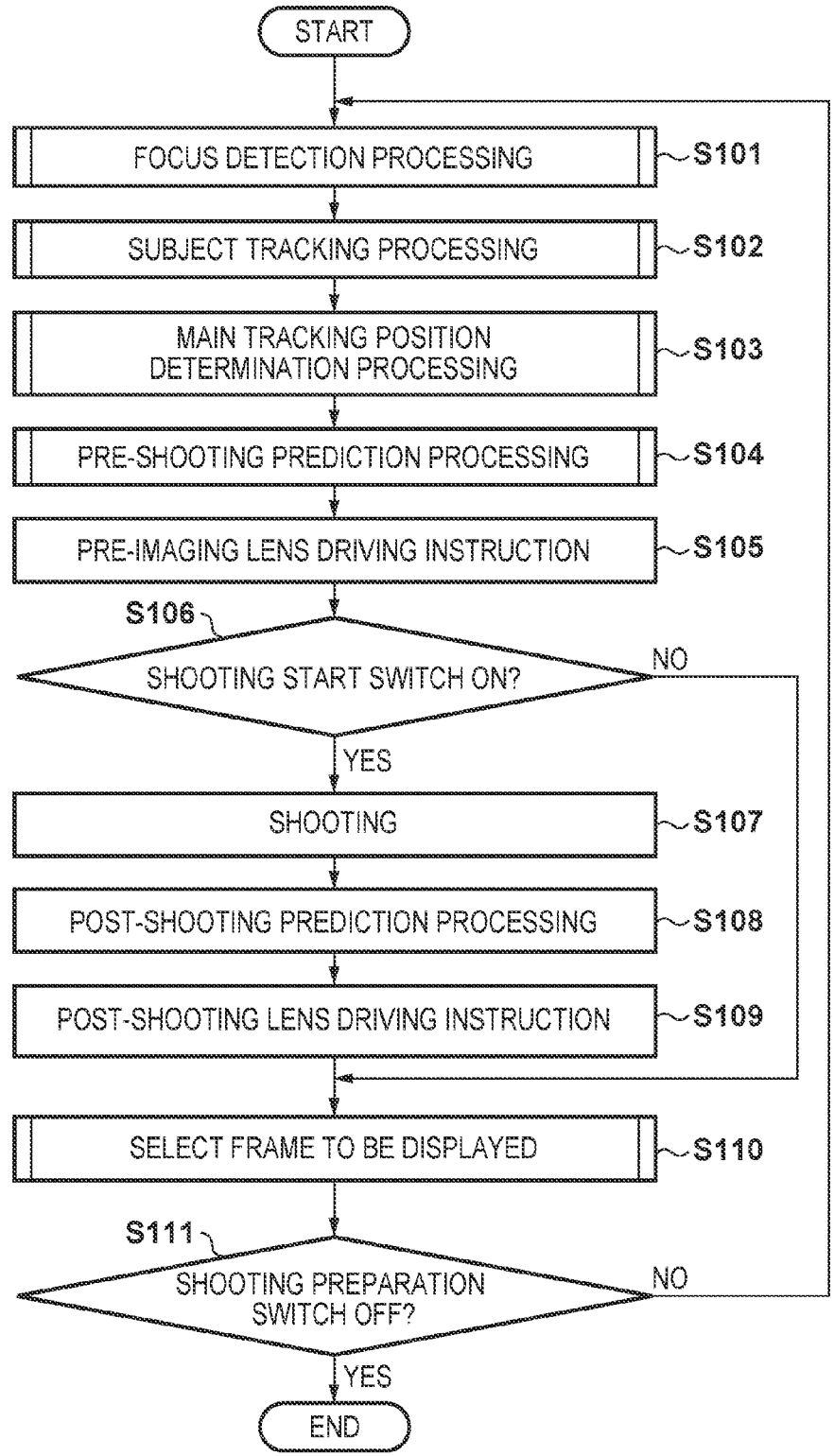
FIG. 4 is a flowchart of focus adjustment and image capture processing according to the embodiment.

Using FIG. 4, the following describes a flow of focus adjustment and image capture processing in the servo shooting mode according to the present embodiment. This processing is started when a shooting preparation instruction is issued by turning ON a shooting preparation switch. Note that in an ordinary camera, the shooting preparation switch is turned ON by pressing a switch serving as shooting button halfway.

Once the processing has been started, in step S101, a focus detection processing is performed. The details of the focus detection processing will be described later using FIG. 5. Then, in step S102, the subject tracking unit 116 executes subject tracking processing. The details of the subject tracking processing will be described later using FIG. 6. Next, in step S103, main tracking position determination processing is performed. The details of the main tracking position determination processing will be described later using FIG. 8.

Figure 9:
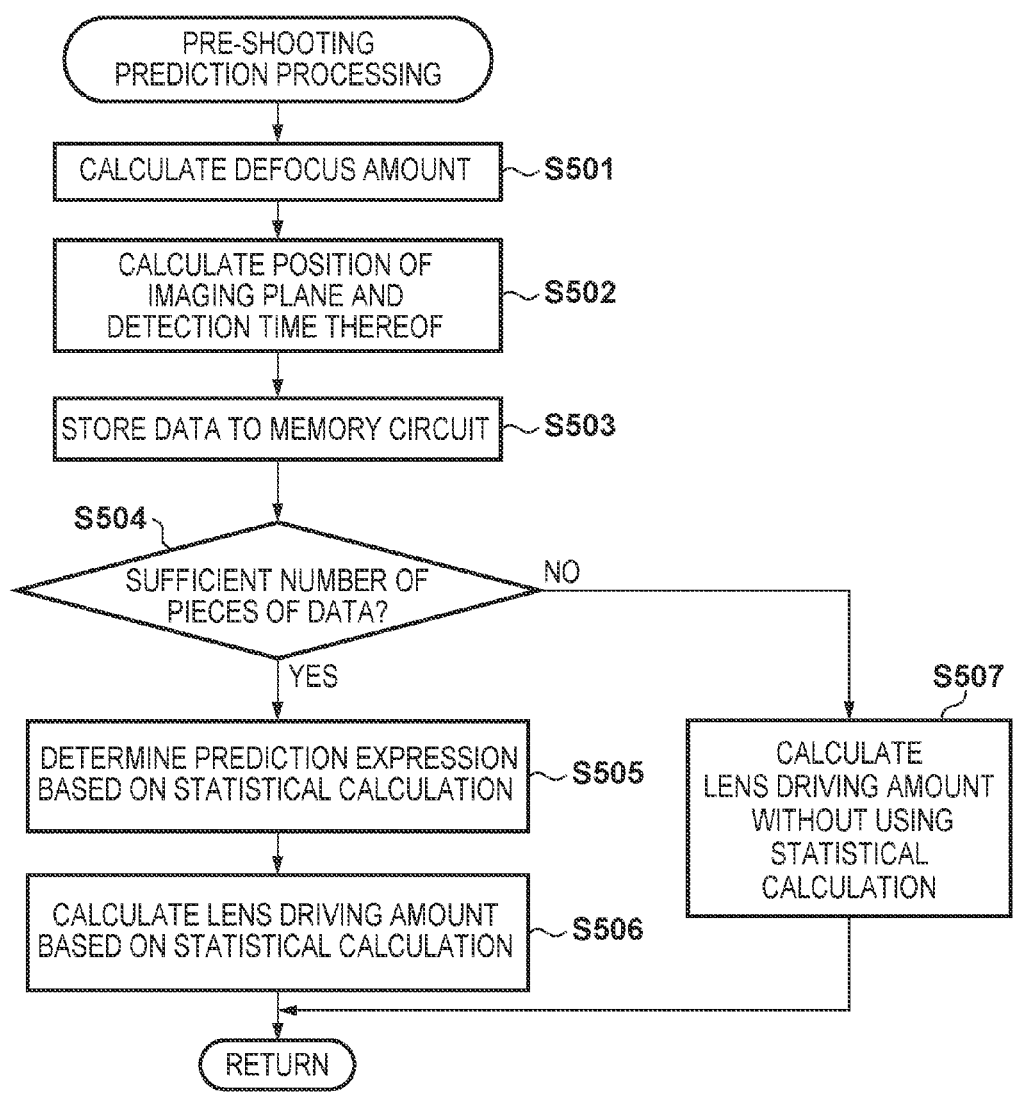
FIG. 9 is a flowchart of pre-shooting prediction processing before image capturing according to the embodiment.

In step S104, pre shooting prediction processing is executed. As will be described later, in the pre-shooting prediction processing, when a shooting start switch is in an ON state, the prediction unit 119 predicts a position of an imaging plane of the subject between when the phase-difference detection is performed in the focus detection processing in step S101 and when the image sensor 103 performs shooting. On the other hand, when the shooting start switch is in an OFF state, the prediction unit 119 predicts a position of the imaging plane of the subject until the next phase-difference detection. The details of a prediction method will be described later using FIG. 9.

In step S105, a lens driving amount that is necessary for moving the imaging lens 120 to focus on the position of the imaging plane of the subject predicted in step S104 is calculated, and the lens CPU 122 is informed of the lens driving amount.

Subsequently, in step S106, the state of the shooting start switch is determined; if the shooting start switch is in the ON state, step S107 follows to perform shooting, and if the shooting start switch is in the OFF state, step S110 follows. Note that in an ordinary camera, the shooting start switch is turned ON by fully pressing the switch serving as the shooting button.

In step S107, the image sensor control circuit 102 is instructed to drive and control the image sensor 103, and an image shot by the image sensor 103 is stored to the memory circuit 101. In step S108, the prediction unit 119 predicts a position of the imaging plane of the subject at the time of the next phase-difference detection, and in step S109, a lens driving amount that is necessary for moving the imaging lens 120 to focus on the position of the imaging plane predicted in step S108 is calculated, and the lens CPU 122 is informed of the lens driving amount.

In step S110, the display frame selectin unit 117 selects a frame to be displayed on a shot image. The details of a display frame selection method will be described later using FIGS. 10A to 10E.

In step S111, whether the shooting preparation switch is in the OFF state is determined; if the shooting preparation switch is in the OFF state, the focus adjustment and image capture processing is ended, and if the shooting preparation switch is in the ON state, the focus adjustment and image capture processing returns to step S101 to repeat the foregoing processes.

(Focus Detection Processing)

Figure 5:
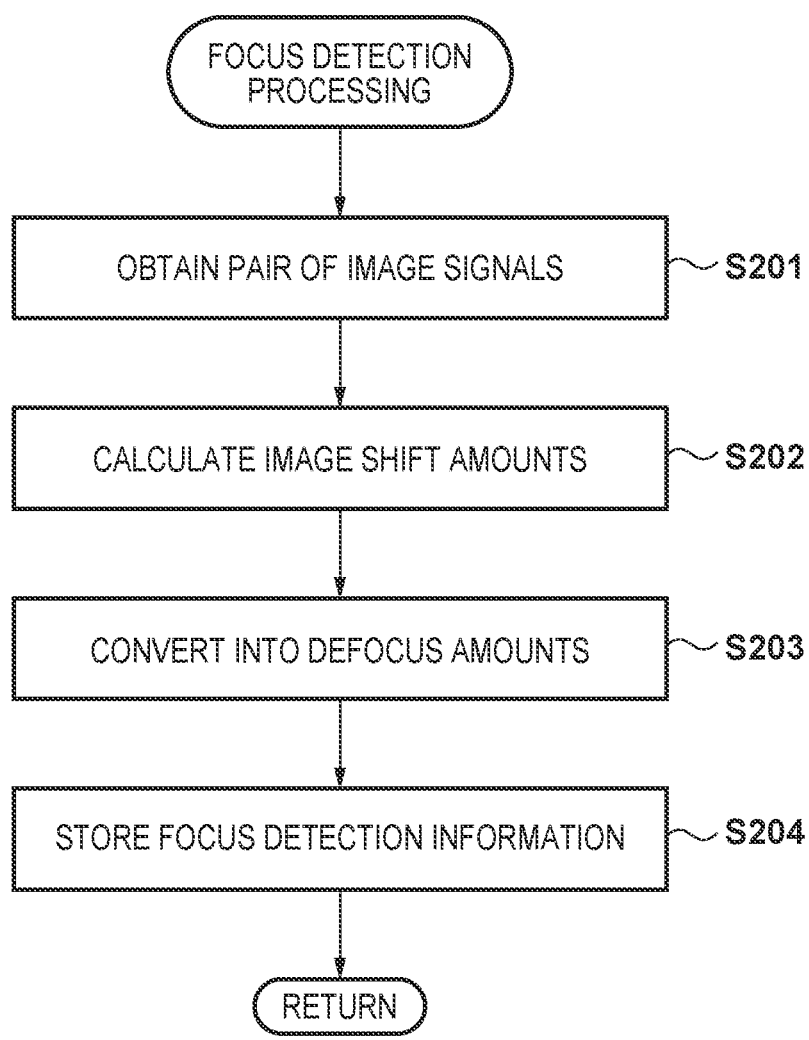
FIG. 5 is a flowchart of focus detection processing according to the embodiment.

Based on a flowchart of FIG. 5, the following describes exemplary operations of the focus detection processing executed in step S101. In step S201, a pair of image signals A and B output from the image sensor 103 is obtained. In step S202, a phase difference between the image signals A and B obtained in step S201 (an image shift amount) is calculated. Here, an image shift amount is calculated for each of focus detection areas (in an example of FIG. 10A, 7×7 areas) obtained by dividing an area 702, in which phase difference detection can be executed within an area 701 displayed on the display 105, of an image shot by the image sensor 103. However, in a case where it is difficult to calculate an image shift amount for every focus detection area because processing speed is limited, for example, image shift amounts may be calculated for part of the focus detection areas.

Subsequently, in step S203, the defocus amount conversion unit 112 converts the image shift amounts calculated in step S202 into defocus amounts. Then, in step S204, the obtained focus detection information is stored to the memory circuit 101. Specifically, the defocus amount of each focus detection area, the shooting time of the image signal A and the image signal B are stored.

(Subject Tracking Processing)

Figure 6:
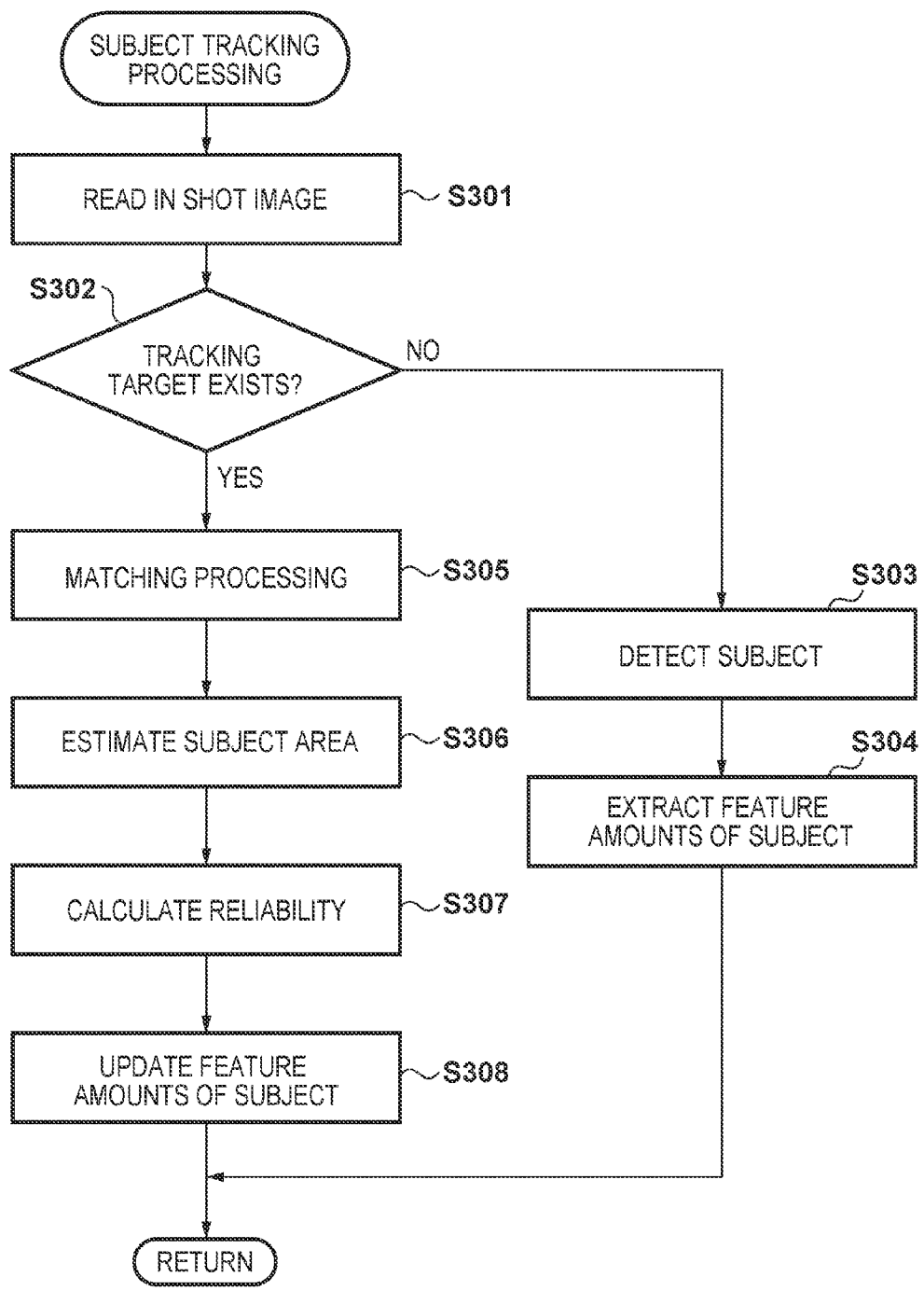
FIG. 6 is a flowchart of subject tracking processing according to the embodiment.

With reference to a flowchart of FIG. 6, the following describes an example of the subject tracking processing executed by the subject tracking unit 116 in step S102.

The following processing executed by the subject tracking unit 116 according to the present embodiment is a template matching method that uses a partial image showing a target subject as a template, cross-references a partial area of a supplied image with the template, and estimates an area with a small degree of difference by changing the partial area to be cross-referenced. In the present embodiment, in order to deal with scale conversion of the target subject in the time direction, feature colors of the subject are extracted, and a subject area is estimated based on the status of distribution of the feature colors within a shot image. The template is updated based on the estimated subject area.

First, in step S301, the image sensor 103 converts reflected light from a subject into electric signals, and image information is obtained by reading out the electric signals. The image information that has been read out is converted into digital signals and transmitted to the subject tracking unit 116.

In step S302, whether a subject serving as a tracking target exists is determined. If the subject serving as the tracking target exists, processes for tracking the subject are executed in steps S305 to S308. If the subject serving as the tracking target does not exist, subject detection is performed in step S303 to determine a subject serving as a tracking target.

A method of the subject detection performed in step S303 is broadly classified into two groups: a detection method based on an instruction from a photographer, and an automatic detection method. In the detection method based on an instruction from a photographer, a position of a subject within a shot image is designated via an input interface including, for example, a touchscreen and buttons, and a subject area is extracted based on information of the designated position. On the other hand, the automatic detection method is commonly implemented in the form of, for example, face detection. Examples of known face detection techniques include a method that uses face related information (skin color information and parts, such as the eyes, nose, and mouth), and a method used in a classifier that performs face detection based on a learning algorithm, a typical example of which is a neural network. In general, face detection is performed using the foregoing methods in combination to improve a detection rate. A specific example is a face detection method described in Japanese Patent Laid-Open No. 2002-251380, which uses the wavelet transform and image feature amounts.

In step S304, feature amounts of the tracking target are extracted from the extracted subject area. In the present embodiment, an image pattern of the subject area is stored as feature amounts to execute the tracking processes based on template matching. Furthermore, a color histogram H of the subject area is stored to perform subject area estimation based on a distribution of feature colors. Thereafter, a waiting state continues until a sampling period of the next shooting.

A description is now given of tracking processes that are executed if it is determined that the subject serving as the tracking target exists in step S302. In this case, matching processing is executed in step S305. The details of template matching will be explained below with reference to FIGS. 7A and 7B. FIG. 7A shows an example of a subject model (template) used in template matching. Reference numeral 601 denotes a partial image (template) showing the subject serving as the tracking target, and a pixel pattern of this partial image is used as feature amounts. Reference numeral 602 represents the feature amounts of the template 601, and luminance signals of pixel data indicate the feature amounts. A feature amount T(i, j) is expressed by Expression (1) provided that, within a template area, the coordinates are denoted by (i, j), the number of pixels in the horizontal direction is W, and the number of pixels in the vertical direction is H.

$$T(i, j)=\{T(0, 0), T(1, 0), \ldots, T(W-1, H-1)\} \quad (1)$$

FIG. 7B shows information of an image used in search for the subject serving as the tracking target. Reference numeral 603 denotes a range of an image to which matching processing is applied (search range). The coordinates in the search range 603 are denoted by (x, y). Reference numeral 604 denotes a partial area from which a matching evaluation value is obtained. Reference numeral 605 represents feature amounts in the partial area 604, and similarly to the template 601, luminance signals of image data indicate the feature amounts. A feature amount S(i, j) is expressed by Expression (2) provided that, within the partial area, the coordinates are denoted by (i, j), the number of pixels in the horizontal direction is W, and the number of pixels in the vertical direction is H.

$$S(i, j)=\{S(0, 0), S(1, 0), \ldots, S(W-1, H-1)\} \quad (2)$$

The sum of absolute differences (SAD) is used as a calculation method for evaluating the similarity between the template 601 and the partial area 604. An SAD value is calculated using Expression (3).

$$V(x, y) = \sum_{y=0}^{H-1} \sum_{x=0}^{W-1} |T(i, j) - S(i, j)| \quad (3)$$

SAD values V(x, y) are calculated while shifting the partial area 604 by one pixel at a time, starting from the upper-left corner of the search range 603. The coordinates (x, y) at which the minimum SAD value V(x, y) has been calculated indicates a position that is most similar to the template 601. In other words, there is a high possibility that the subject serving as the tracking target exists at the position with the minimum SAD value V(x, y) in the search range 603.

Although one-dimensional information of luminance signals is used as feature amounts in the foregoing example, three-dimensional information of, for example, brightness signals, hue signals, and saturation signals may be used as feature amounts. Furthermore, rather than the above-described SAD values, values obtained by a different calculation method, such as normalized correlation coefficients (NCC), may be used as matching evaluation values.

Subsequently, in step S306, an area of the subject serving as the tracking target (hereinafter, "tracking area") is detected based on the position detected in the matching processing in step S305. Using Expression (4), information amounts are calculated from the color histogram within a tracking area, which was stored in step S304, and a color histogram $H_{out}$ of an entirety or a part of a shot image of the current time.

$$I(a) = -\log_2 H_{in}(a)/H_{out}(a) \quad (4)$$

Each information amount is obtained from a corresponding bin of the color histograms, and indicates the occurrence probability within the subject area relative to an entirety or a part of the image. A map indicating the possibility of existence of the subject serving as the tracking target can be obtained by processing the pixels in the shot image of the current time based on these information amounts. A tracking area is detected based on this map. The subject tracking unit 116 outputs the position of the center of mass of the detected tracking area as the tracking position.

Subsequently, in step S307, the reliability of the tracking position calculated in step S306 is calculated. The certainty of subject tracking is interfered by various factors, including a change in the subject, the existence of a similar subject, and accumulation of tracking errors. The reliability is calculated by multiplying these factors by various types of evaluation values obtained through the matching processing and tracking area estimation.

The larger the minimum value V(x, y) obtained in the matching processing using Expression (3), the larger the change in the subject. In view of this, the reliability is set such that the larger the minimum value, the lower the reliability. Furthermore, there is a high possibility that a similar subject exists when a value that is similar to the minimum value V(x, y) obtained in the matching processing using Expression (3) is obtained at a position that is distant from the estimated position of the subject by a predetermined threshold or more. In view of this, the reliability is set such that the higher the degree of similarity between the SAD value obtained at the position that is distant from the estimated position of the subject by the predetermined threshold or more and the minimum SAD value, the lower the reliability. Moreover, the smaller the entropy (the average, or expected value) of the information amounts within the subject area, which are obtained using Expression (4) to indicate the color features of the subject, the larger the change in the subject. This entropy is expressed by Expression (5).

$$E_{in} = -\sum_{a=1}^{N} H_{in}(a)I(a) \quad (5)$$

The reliability is set such that the smaller the value given by Expression (5), the smaller the reliability. Furthermore, the larger the entropy (the average, or expected, value) of the information amounts outside the subject area, which are obtained using Expression (4) to indicate the color features of the subject, the higher the possibility of existence of a similar target. This entropy is expressed by Expression (6).

$$E_{out} = -\sum_{a=1}^{N} H_{out}(a)I(a) \qquad (6)$$

The reliability is set such that the larger the value given by Expression (6), the smaller the reliability. In addition, once the certainty of subject tracking has dropped, the reliability of tracking also drops thereafter. In view of this, the reliability is calculated in consideration of a history of reliabilities. For example, an average reliability value within a predetermined period is used as the reliability of a current frame. The reliability of the tracking position is calculated as described above.

Subsequently, in step S308, the feature amounts of the subject are updated. Specifically, the template is updated based on the tracking area estimated in step S306, thereby making it possible to deal with a change in the scale of the subject. This marks the end of the subject tracking processing, and thereafter, a waiting state continues until a sampling period of the next shooting.

(Main Tracking Position Determination Processing)

Figure 8:
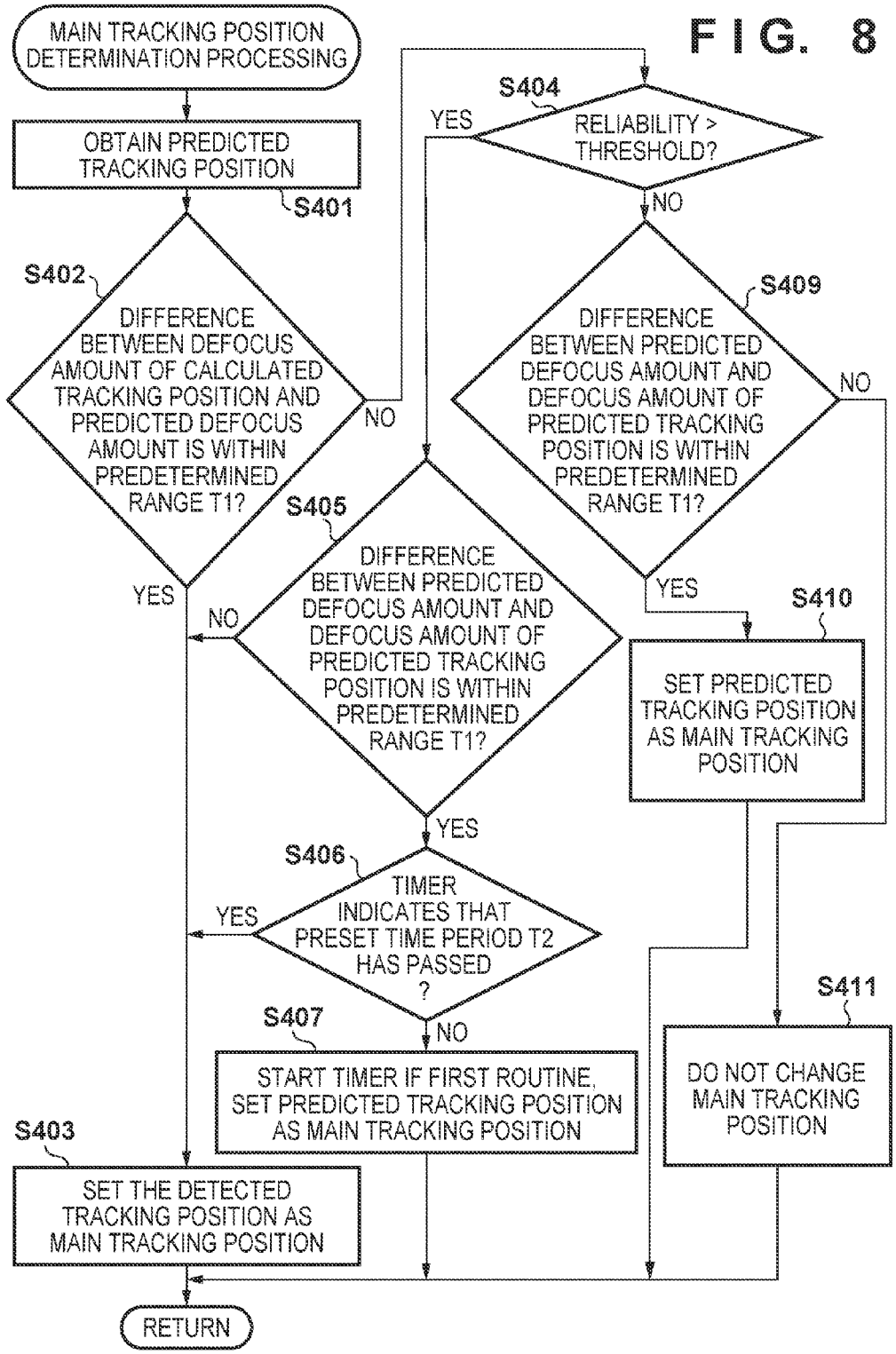
FIG. 8 is a flowchart of main tracking position determination processing according to the embodiment.

With reference to a flowchart of FIG. 8, the following describes the main tracking position determination processing executed in step S102. In step S401, a position of an imaging plane of the subject at the time of shooting performed by the image sensor 103 is predicted using a prediction expression of a position of an imaging plane of the subject that was calculated in previous prediction processing, which will be described later. Next, a defocus amount to the predicted position of the imaging plane is predicted by obtaining a difference between the position of the imaging plane of the subject at the time of shooting and an imaging plane of a lens when shooting is actually performed. Then, using the defocus amounts of the respective divided areas detected in step S101, from among divided areas that are predetermined on the basis of the main tracking position that was selected last time, a divided area having a defocus amount (focus state) that is closest to the predicted defocus amount (predicted defocus state) is selected as a predicted tracking position of the subject.

Then in step S402, it is determined whether or not a difference between the defocus amount (focus state) of the tracking position calculated by the subject tracking unit 116 in step S102 and the defocus amount (focus state) of the predicted defocus amount in step S401 is within a predetermined range T1. If the difference is within the predetermined range T1, the processing proceeds to step S403, and the tracking position calculated by the subject tracking unit 116 in step S102 is set as the main tracking position. If the difference is not within the predetermined range T1, the processing proceeds to step S404.

In step S404, reliability of the tracking position calculated in step S102 is determined. If the reliability is higher than a predetermined threshold, the processing proceeds to step S405, whereas if the reliability is equal to or lower than the threshold, the processing proceeds to step S409.

In step S405, it is determined whether a difference between the defocus amount that was predicted in step S401 and the defocus amount of the predicted tracking position that was selected also in step S401 is within a predetermined range T1. This determination is performed because, although a divided area that has a defocus amount closest to the predicted defocus amount is selected from among the predetermined divided areas in step S401 the defocus amount of the selected area does not always coincide with the predicted defocus amount. Accordingly, the predicted defocus amount is compared with the defocus amount of the selected predicted tracking position in order to determine validity of the predicted tracking position. If the difference is within the predetermined range 11, the processing proceeds to step S406, whereas if the difference is not within the predetermined range T1, the processing proceeds to step S403, and the tracking position calculated by the subject tracking unit 116 in step S102 is set as the main tracking position.

In step S406, whether or not a timer indicates that a preset time period T2 has passed. The timer starts at step S407 in a case where step S406 yields NO. Therefore, if the determination in step S406 is performed first time, since the timer has not started yet, NO is always resulted. The timer is used to determine how long a state in which the reliability of the tracking position calculated by the subject tracking unit 116 is high continues. Accordingly, the preset time period T2 may be changed in accordance with the degree of reliability of the calculated tracking position such that in a case where the reliability is high, the preset time period T2 shortened comparing to a case where the reliability is low. Alternatively, the preset time period T2 may be changed in accordance with the difference between the defocus amount of the predicted tracking position selected in step S401 and the predicted defocus amount. In this case, when the difference is small, the preset time period T2 is set shorter than when the difference is large. In a case where the timer indicates that the preset time period T2 has not passed, the predicted tracking position calculated in step S401 is set as the main tracking position in step S407. In this way, in a case where the movement of the subject can be predicted, the predicted tracking position set by the prediction unit 119 is selected, and in a case where the movement of the subject is hard to predict, it is possible to facilitate determination of a correct tracking position using the reliability of the subject tracking unit 116. If the timer indicates that the preset time period T2 has passed, the processing proceeds to step S403 where the tracking position calculated by the subject tracking unit 116 in step S102 is set as the main tracking position.

On the other hand, if it is determined in step S404 that the reliability of the tracking position calculated by the subject tracking unit 116 is low, the processing proceeds to step S409. In step S409, similarly to step S405, it is determined whether the difference between the defocus amount that was predicted in step S401 and the defocus amount of the predicted tracking position that was selected also in step S401 is within the predetermined range 11. If the difference is within the predetermined range T1, the processing proceeds to step S410, and sets the predicted tracking position calculated in step S401 as the main tracking position. Whereas, if the difference is not within the predetermined range T1, the processing proceeds to step S411, and the main tracking position is not newly set, because the reliabilities of both of the predicted tracking position and the calculated tracking position are low, and setting for not performing focus adjustment is set.

(Pre-Shooting Prediction Processing)

The following describes the pre-shooting prediction processing, which is executed by the prediction unit 119 in step S104 to predict a position of a future imaging plane from changes in the positions of a plurality of past imaging planes and in the shooting times thereof. A method of predicting a position of a future imaging plane is elaborated in Japanese Patent Laid-Open No. 2001-21794; the following description of the present embodiment deals with an example in which the prediction is performed using statistical calculation with reference to a flowchart of FIG. 9.

First, in step S501, the defocus amount conversion unit 112 calculates a defocus amount from a phase difference that was detected by the phase-difference detection unit 111 from a divided area corresponding to the main tracking position set in step S103. In the next step S502, a position of an imaging plane corresponding to the calculated defocus amount and the shooting time thereof are calculated. In general, a certain charge accumulation period is required to obtain image signals from the image sensor 103. Therefore, a midpoint between the accumulation start time and the accumulation end time is used as the shooting time, and a position of an imaging plane of the subject is calculated by adding the defocus amount to a relative extension amount of the imaging lens 120.

In the next step S503, data composed of the pair of the position of the imaging plane and the shooting time is stored to the memory circuit 101. The structure of data stored in the memory is in the form of a queue; pieces of data are sequentially stored until the number of stored pieces of data reaches a preset number, and thereafter, the newest piece of data is stored by overwriting the oldest piece of data.

In the next step S504, whether the number of pieces of data stored in the memory circuit 101 is sufficient to perform the statistical- calculation is determined. If it is determined that the number of stored pieces of data is sufficient to perform the statistical calculation, the pre-shooting prediction processing proceeds to step S505, and a prediction expression is determined based on the statistical calculation.

In step S505, coefficients α, β, and γ are statistically determined by multiple regression analysis using a prediction function f(t) shown in Expression (7); the determination of the prediction expression based on the statistical calculation is elaborated in Japanese Patent Laid-Open No. 2001-21794, and thus a detailed description thereof will be omitted. A value of n in Expression (7) yields the smallest prediction error when prediction is performed with respect to samples of a plurality of representative shooting scenes related to moving body prediction.

$$f(t)=\alpha+\beta t+\gamma t^n \qquad (7)$$

After the prediction expression has been determined in step S505, the pre-shooting prediction processing proceeds to step S506 in which a position of an imaging plane at the preset future time is predicted, and a lens driving amount that is necessary for the imaging lens 120 to focus on the predicted position of the imaging plane is calculated.

On the other hand, if it is determined that the number of stored pieces of data is not sufficient in step S504, the pre-shooting prediction processing proceeds to step S507 in which a lens driving amount is calculated based on the calculated defocus amount without using the statistical calculation.

(Display Frame Selection Processing)

Next, a description is given of the display frame selection processing of selecting a frame to be displayed on the display 105 performed by the display frame selection unit 117 in step S110 with reference to FIGS. 10A to 10E.

In this embodiment, there are two cases for selecting the main tracking position; one is to select the main tracking position from the focus detection areas (for example, 3×3 divided areas) with a previous main tracking position as its center, and the other is to select the main tracking position from a position calculated by the subject tracking unit 116. The way of selecting a display frame differs depending upon the cases. A selection method of the display frame in each case will be explained with reference to FIGS. 10A to 10E.

First, with reference to FIG. 10A, a display frame is explained in a case where the predicted tracking position is selected as the main tracking position from among the focus detection areas with the previous main tracking position as their center. The area 701 shows a display range of the display 105, and an image shot by the image sensor 103 is displayed in the area 701. The area 702 indicates a range within an image shot by the image sensor 103 in which phase difference detection can be performed by the phase-difference detection unit 111, and a display frame can be displayed in the area 702. A focus detection areas 704 indicates a range, with respect to a subject 703, with the previous main tracking position as their center. The focus detection areas 704 includes focus detection portions to which references W0 to W8 are assigned (FIG. 10D). In FIG. 10A, a frame which corresponds to part of the focus detection portions W0 to W8 in which a difference between the defocus amount of the main tracking position selected from the focus detection areas 704 and a defocus amount of each of the focus detection portions W0 to W8 is smaller than a predetermined value T3 is selected as the display frame.

FIG. 10B is a diagram showing an example in a case where the tracking position calculated by the subject tracking unit 116 is selected as the main tracking position 706 and is within the focus detection areas 704. In this case, from among the focus detection areas 704 (W0 to W8) which incorporate the main tracking position 706, a frame corresponding to part of the focus detection portions W0 to W8 where a difference between the defocus amount of the main tracking position 706 and the defocus amount of each of the focus detection portions W0 to W8 is smaller than a predetermined value 13 is selected as a display frame.

FIG. 10C is a diagram showing an example in a case where the tracking position calculated by the subject tracking unit 116 is selected as the main tracking position 707 and is not within the focus detection areas 704. In this case, a weight is assigned to a defocus amount of each of the focus detection portions W0 to W8 depending upon the distance from the main tracking position 707 and each of the focus detection portions W0 to W8. A frame corresponding to part of the focus detection areas 704 (W0 to W8) where a difference between the defocus amount of the main tracking position 707 and a defocus amount of each of the focus detection portions W0 to W8 is smaller than a predetermined value T4 is selected as a display frame. FIG. 10E shows an example of the display frame superimposed on an image for a user through the display 105 in this case.

According to the embodiment as described above, in a case where movement of a subject is hard to predict, tracking methods is changed within a predetermined period in accordance with reliability of tracking, and a display frame indicating a subject is continuously displayed based on the main tracking position and focus detection areas. In this way, it is possible to increase the number of states in which subject tracking is possible.

Further, in the embodiment, after the subject tracking unit 116 performs the matching processing using the SAD value in step S305 of FIG. 6, a tracking position is determined in step S306, then reliability is calculated in consideration of various factors in step S307. However, step S307 may be omitted, and a reciprocal of the SAD value obtained in step S305 may be used as reliability (reliability increase as the SAD value decreases).

Further, it is determined in step S406 in FIG. 8 that how long the state in which reliability of the tracking position is high continues, however, the present invention is not limited to this. For example, if the SAD value obtained in step S305 in FIG. 6 is equal to or less than a threshold, it may be determined that the tracking is successful, and if the time period during which the tracking is determined successful is equal to or longer than the preset time period 12, the processing may proceed to step S403. Further, it is determined in step S406 that whether the timer indicates that the preset time period T2 has passed, however, if a time period required for performing tracking processing varies depending upon the size or number of target subjects to be tracked, the determination may be performing using the number of times instead of a time period. More specifically, if reliability that is equal to or higher than a threshold is successively obtained predetermined number of times or more, or if the tracking is successfully performed successively predetermined number of times or more, processing may be moved from step S406 to S403. Alternatively, if it is determined that reliability is high or the tracking is successfully performed at more than a predetermined ratio within a predetermined time period or the predetermined number of times, processing may be moved from step S406 to S403.

Other Embodiments

The present invention may be applied to a system composed of a plurality of devices, or to an apparatus composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass such modifications and equivalent structures and functions.

This application claims the benefit of Japanese Patent Application No. 2016-143736, filed on Jul. 21, 2016, and No. 2017-068746, filed on Mar. 30, 2017 which are hereby incorporated by reference herein in their entirety.

What is claimed is:

1. A focus adjusting apparatus, comprising:
a tracking unit that detects a first area of a subject to be tracked, and reliability of a tracking position from an image signal output from an image sensor that captures a subject image formed on the image sensor by an optical system;
a focus detection unit that detects focus states of a plurality of focus detection areas based on the image signal that is output from the image sensor;
a determination unit that determines an in-focus area for which focus adjustment of the optical system is to be performed;
a prediction unit that predicts a focus state in next focus detection based on a history of focus states of the in-focus area detected by the focus detection unit; and
a selection unit that selects a second area from the plurality of focus detection areas,
wherein the determination unit determines the first area as the in-focus area in a case where a state in which the reliability is higher than a predetermined first threshold continues for a predetermined time period or longer, and determines the second area as the in-focus area in a case where the state does not continue for the predetermined time period.

2. The focus adjusting apparatus according to claim 1, wherein the selection unit selects the second area from predetermined part of the plurality of focus detection areas.

3. The focus adjusting apparatus according to claim 1, wherein, in a case where a difference between a focus state of the first area and the predicted focus state is within a predetermined first range, the determination unit determines the first area as the in-focus area regardless of the reliability.

4. The focus adjusting apparatus according to claim 1, wherein, in a case where the reliability is higher than the first threshold and a difference between a focus state of the second area and the predicted focus state is not within a second range, the determination unit determines the first area as the in-focus area.

5. The focus adjusting apparatus according to claim 1, wherein, in a case where the reliability is equal to or less than the first threshold and a difference between a focus state of the second area and the predicted focus state is within a second range, the determination unit determines the second area as the in-focus area.

6. The focus adjusting apparatus according to claim 1, wherein, in a case where the reliability is equal to or less than the first threshold and a difference between a focus state of the second area and the predicted focus state is not within a second range, the determination unit determines the in-focus area determined last time as the in-focus area.

7. The focus adjusting apparatus according to claim 1, wherein the predetermined time period is changed in accordance with at least one of the reliability and a difference between a focus state of the second area and the predicted focus state.

8. The focus adjusting apparatus according to claim 1, further comprising:
a display unit that displays an image based on the image signal;
a setting unit that sets an area corresponding to the in-focus area determined by the determination unit and an area that satisfies a predetermined condition,
wherein the display unit superimposes a display that indicates the area set by the setting unit on the image.

9. The focus adjusting apparatus according to claim 8, wherein the predetermined condition is that a difference between the focus state of each of the part of the focus detection areas and the focus state of an area corresponding to the in-focus area is smaller than a predetermined threshold.

10. The focus adjusting apparatus according to claim 8, wherein the predetermined condition is that a difference between the focus state of an area corresponding to the in-focus area and a weighted focus state of each of the part of the focus detection areas is smaller than a predetermined threshold, wherein each weight is based on a distance from the in-focus area.

11. An image capturing apparatus, comprising:
an image sensor that outputs as image signal by capturing a subject image formed by an optical system; and
a focus adjusting apparatus that comprises:
a tracking unit that detects a first area of a subject to be tracked, and reliability of a tracking position from an image signal output from an image sensor that captures a subject image formed on the image sensor by an optical system;
a focus detection unit that detects focus states of a plurality of focus detection areas based on the image signal that is output from the image sensor;
a determination unit that determines an in-focus area for which focus adjustment of the optical system is to be performed;
a prediction unit that predicts a focus state in next focus detection based on a history of focus states of the in-focus area detected by the focus detection unit; and
a selection unit that selects a second area from the plurality of focus detection areas,
wherein the determination unit determines the first area as the in-focus area in a case where a state in which the reliability is higher than a predetermined first threshold continues for a predetermined time period or longer, and determines the second area as the in-focus area in a case where the state does not continue for the predetermined time period.

12. A focus adjusting method, comprising:
detecting a first area of a subject to be tracked, and reliability of a tracking position from an image signal output from an image sensor that captures a subject image formed on the image sensor by an optical system;
detecting focus states of a plurality of focus detection areas based on the image signal that is output from the image sensor;
determining an in-focus area for which focus adjustment of the optical system is to be performed;
predicting a focus state in next focus detection based on a history of focus states of the detected in-focus area; and
selecting a second area from the plurality of focus detection areas,
determining the first area as the in-focus area in a case where a state in which the reliability is higher than a predetermined first threshold continues for a predetermined time period or longer, and determining the second area as the in-focus area in a case where the state does not continue for the predetermined time period.

13. The focus adjusting method according to claim 12, further comprising:
setting an area corresponding to the determined in-focus area and an area that satisfies a predetermined condition; and
displays an image based on the image signal, and superimposes a display that indicates the set area on the image.

14. A computer-readable storage medium having stored therein a program which is executable by a computer, the program having program codes for realizing the focus adjusting method that comprises:
detecting a first area of a subject to be tracked, and reliability of a tracking position from an image signal output from an image sensor that captures a subject image formed on the image sensor by an optical system;
detecting focus states of a plurality of focus detection areas based on the image signal that is output from the image sensor;
determining an in-focus area for which focus adjustment of the optical system is to be performed;
predicting a focus state in next focus detection based on a history of focus states of the detected in-focus area; and
selecting a second area from the plurality of focus detection areas,
determining the first area as the in-focus area in a case where a state in which the reliability is higher than a predetermined first threshold continues for a predetermined time period or longer, and determining the second area as the in-focus area in a case where the state does not continue for the predetermined time period.

* * * * *